United States Patent Office 2,783,556
Patented Mar. 5, 1957

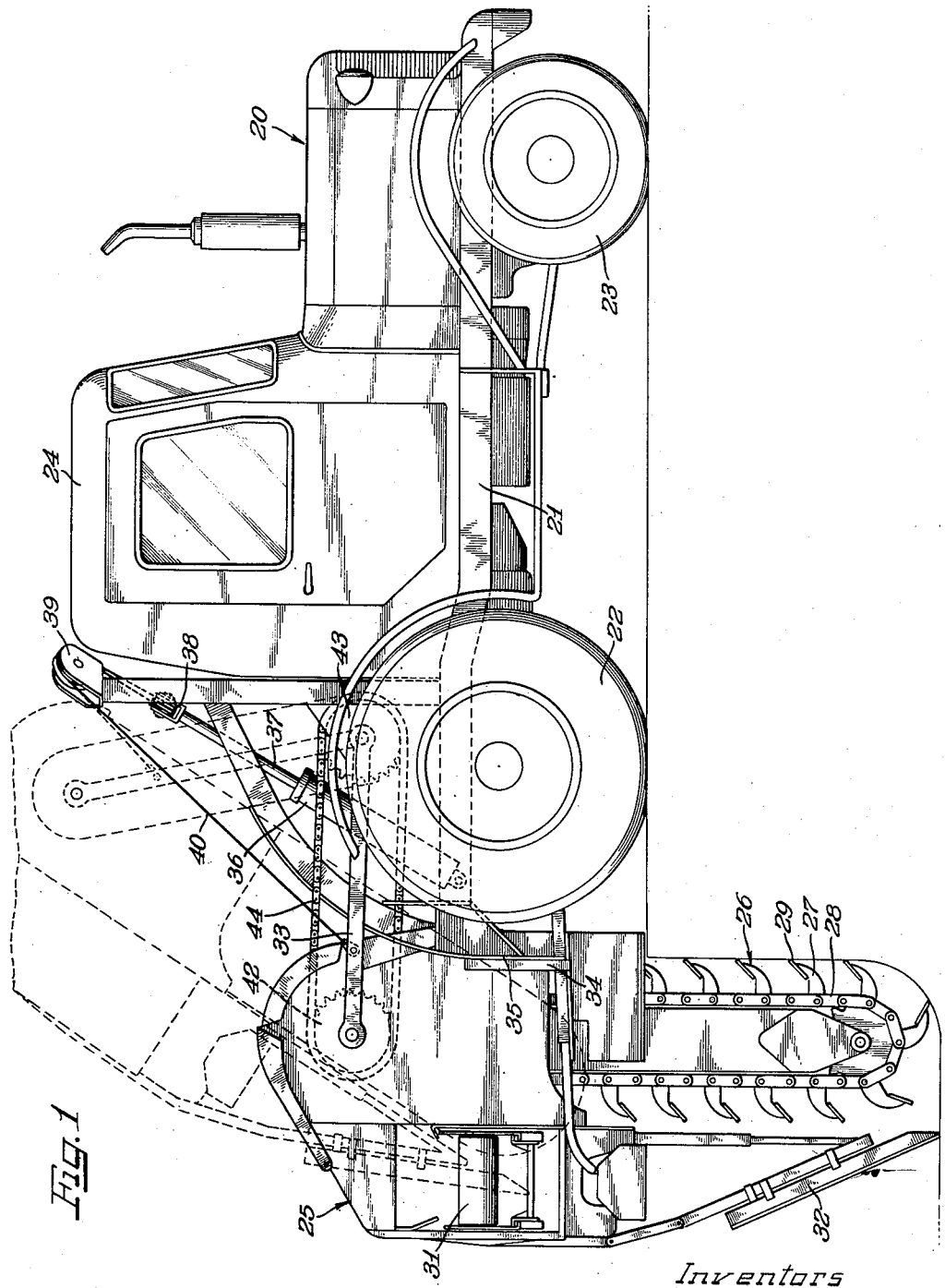

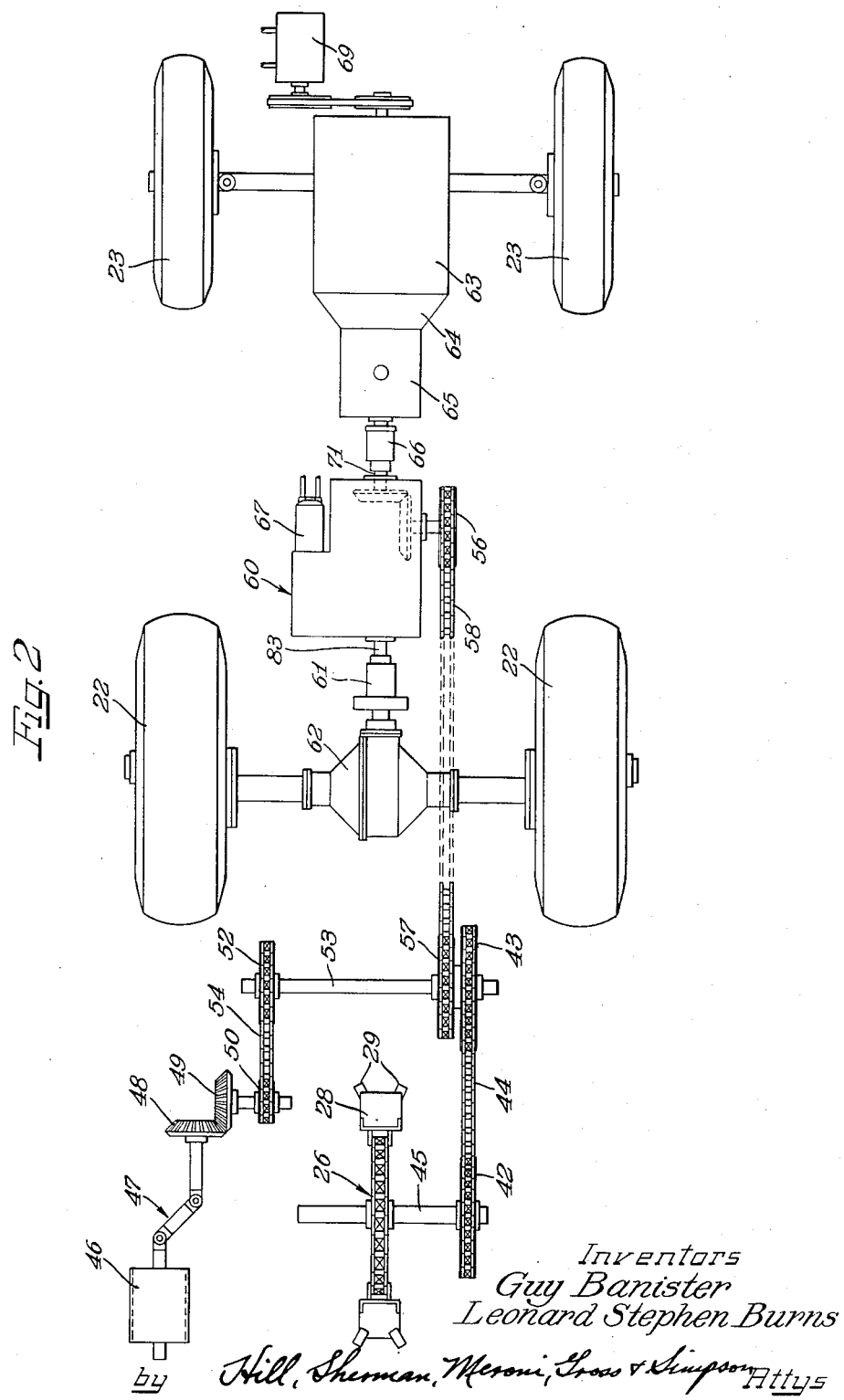

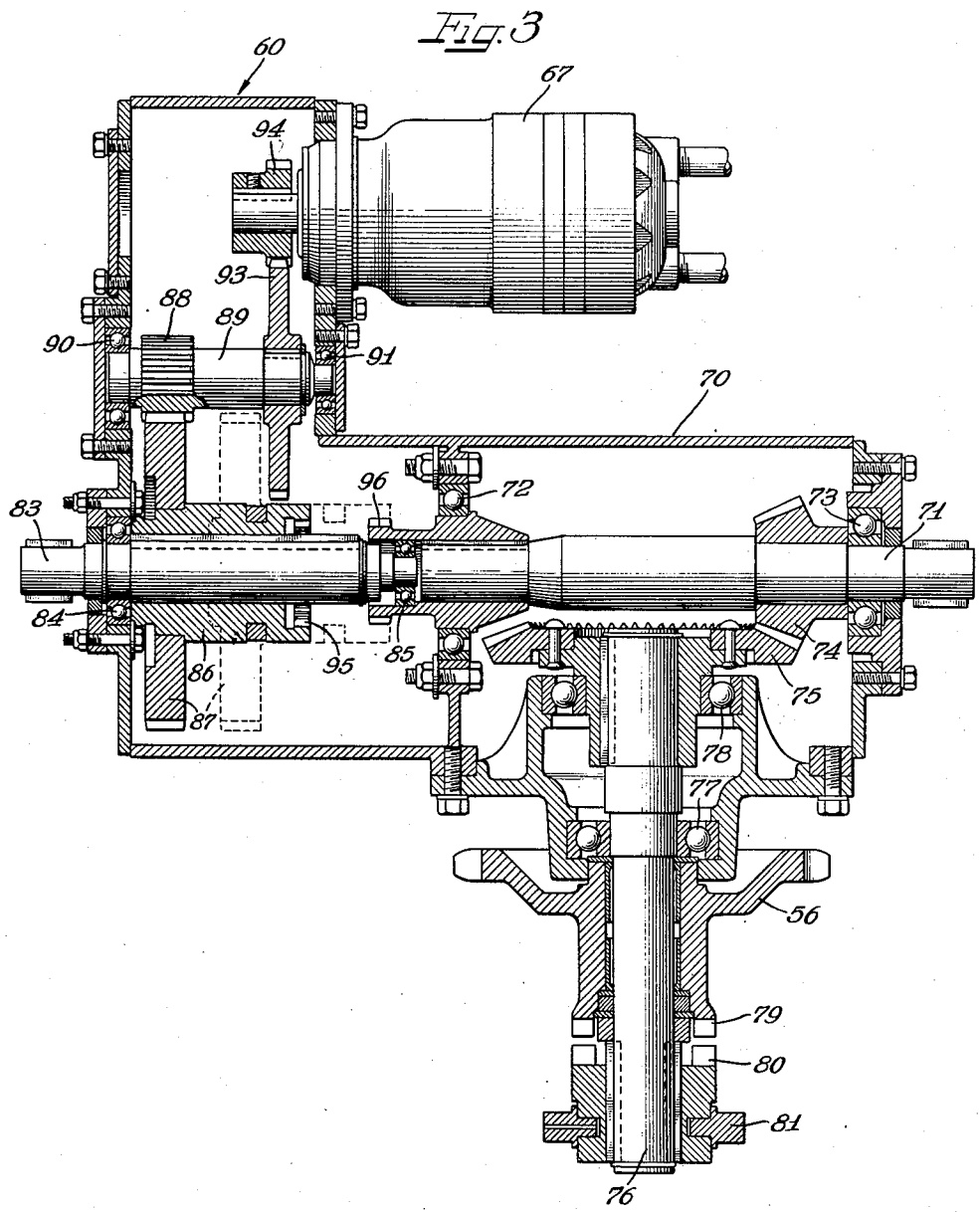

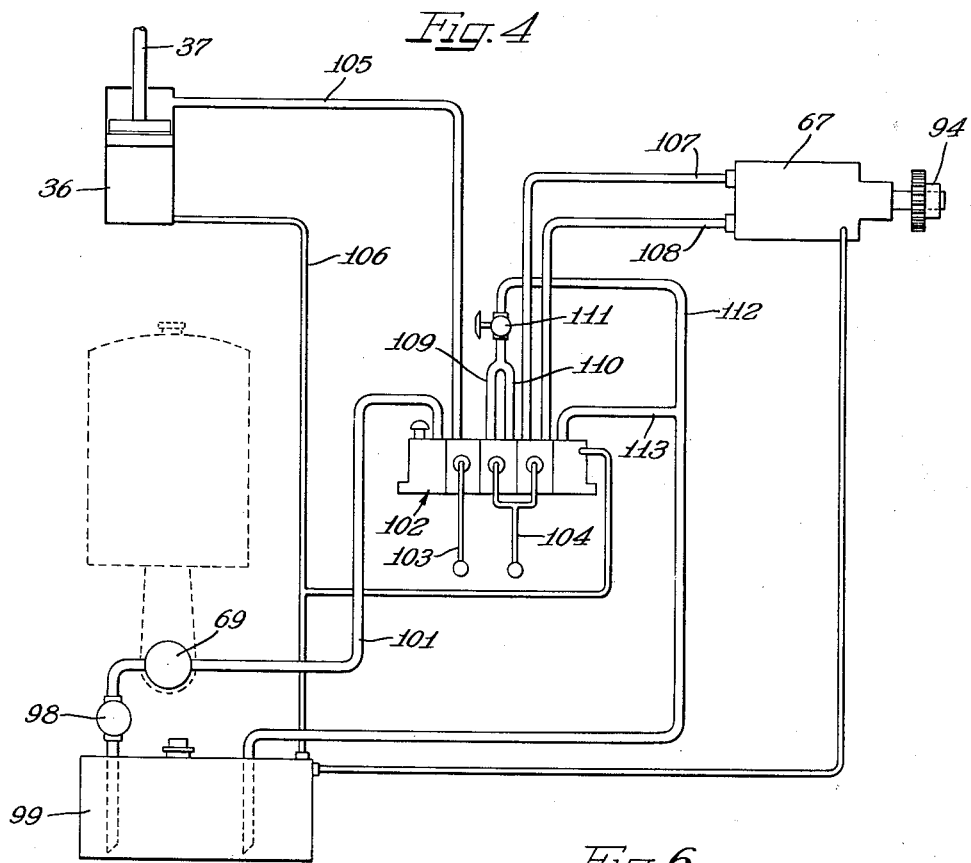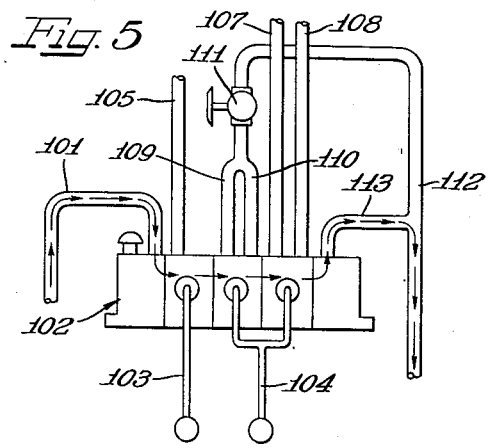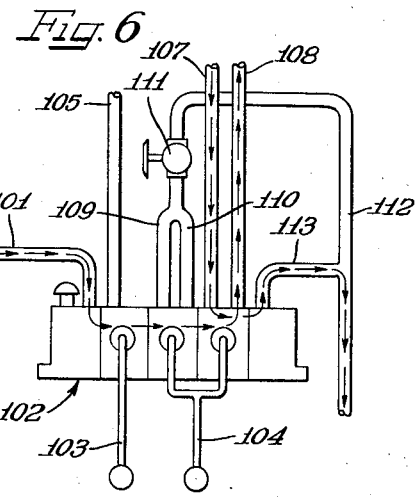

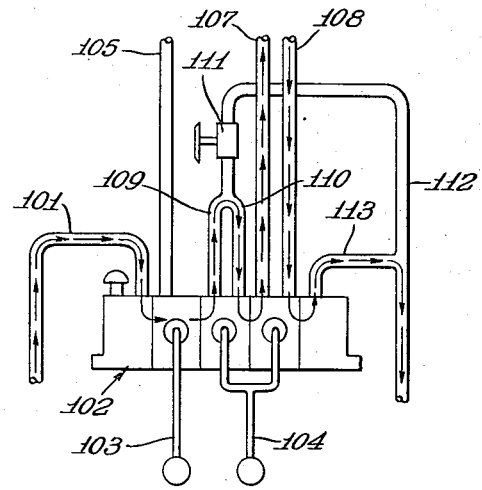
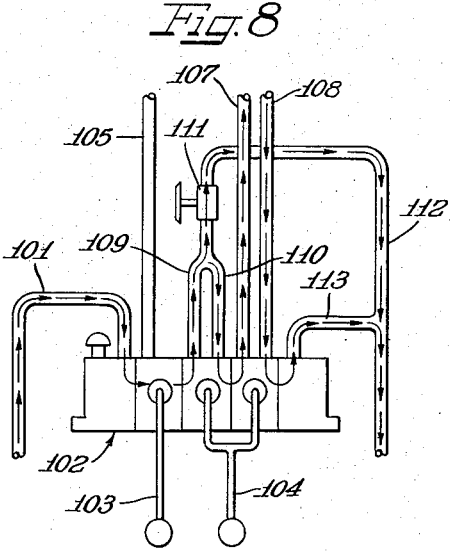
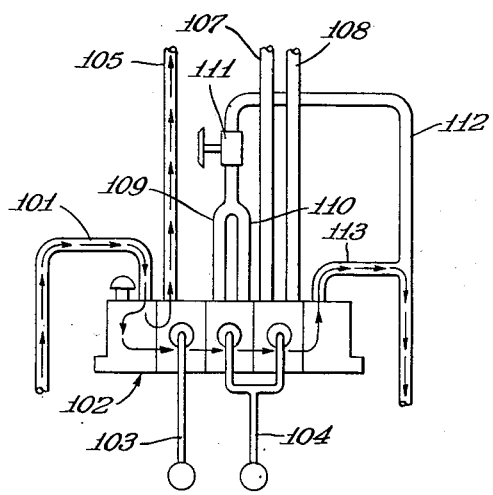
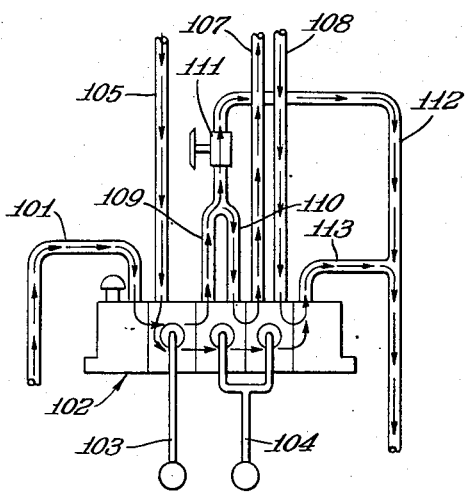

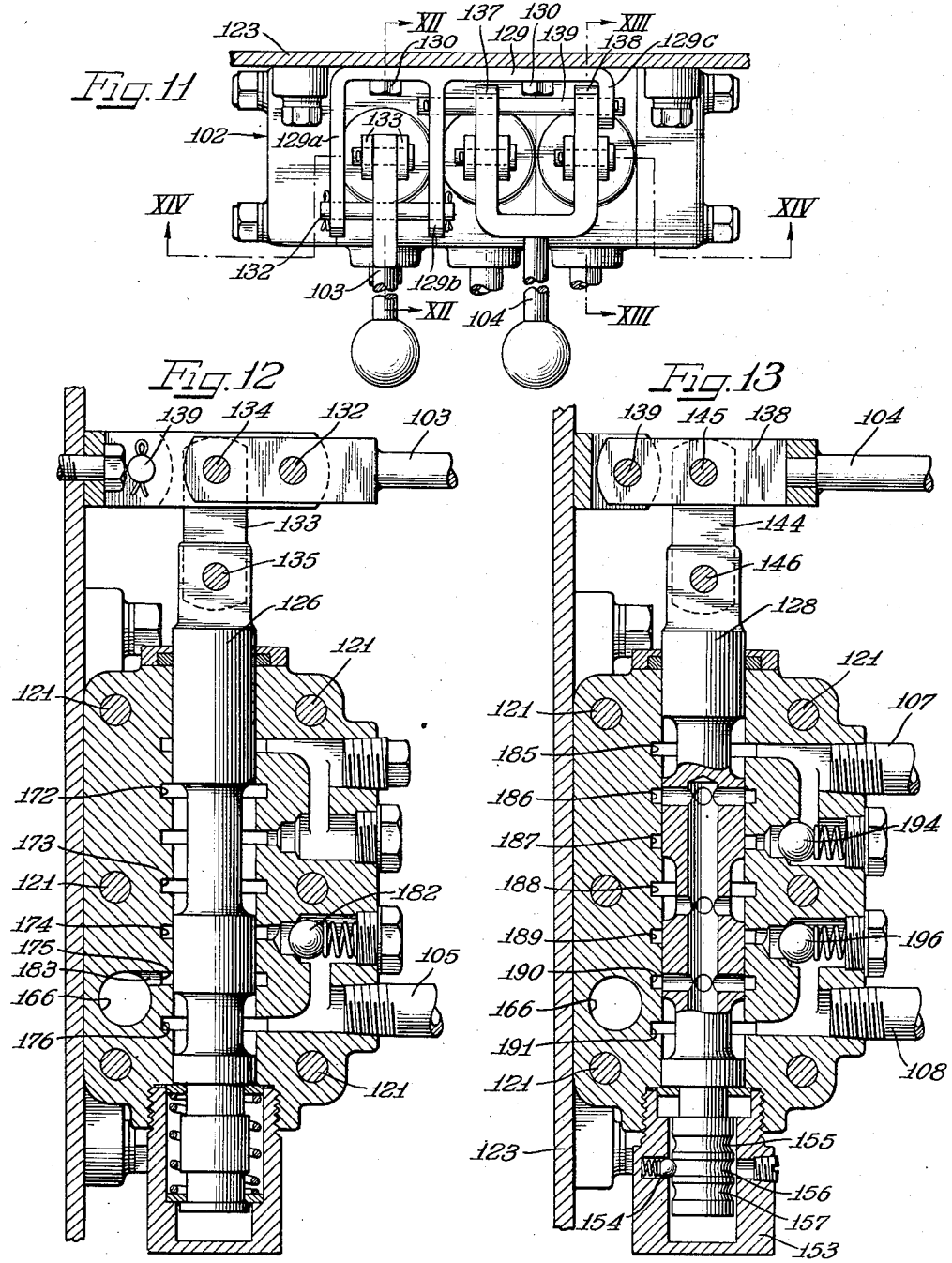

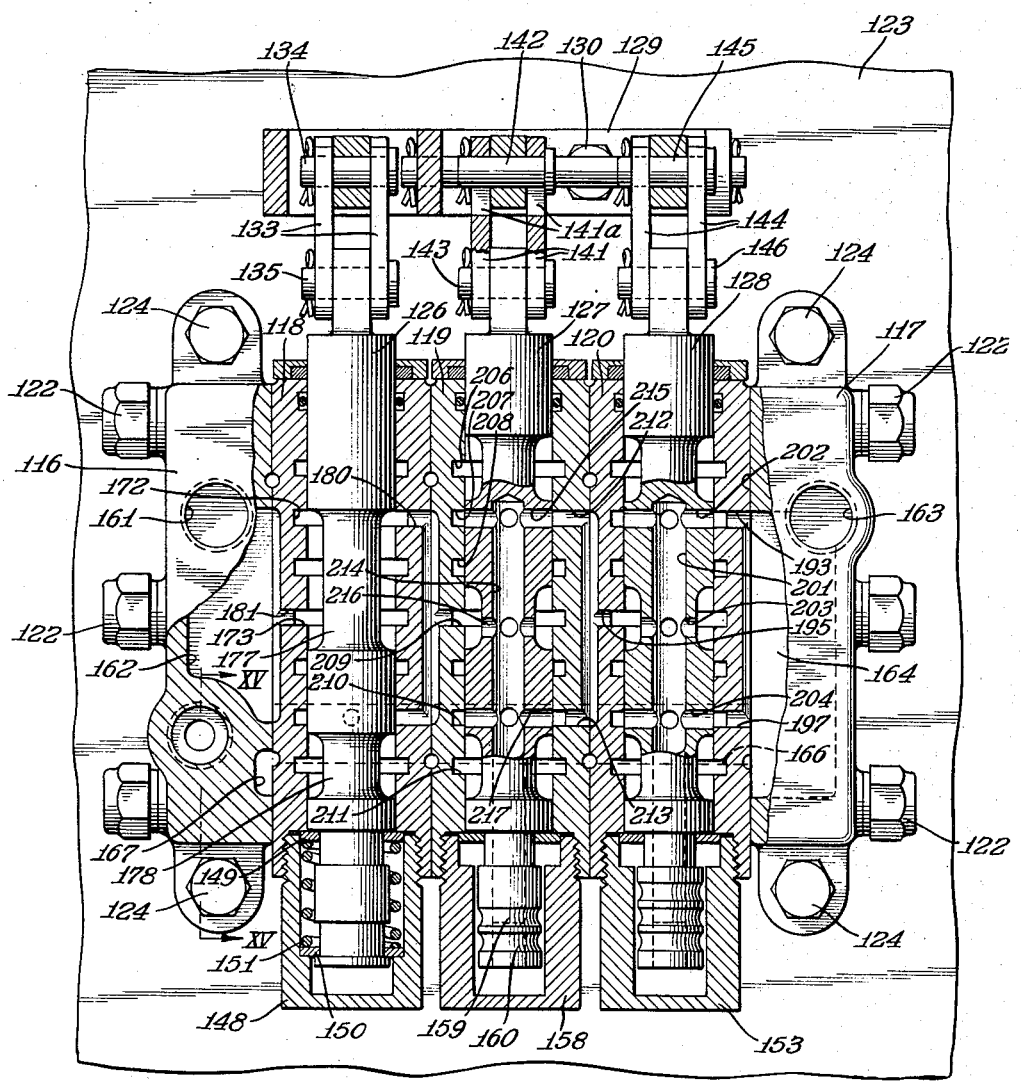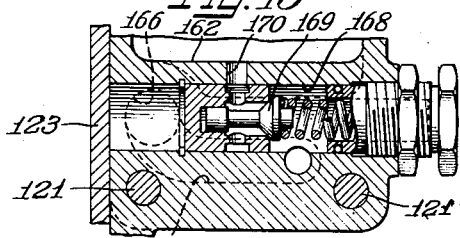

2,783,556

HYDRAULICALLY CONTROLLED DIGGER

Leonard Stephen Burns and Guy Banister, Aurora, Ill., assignors to Barber-Greene Company, Aurora, Ill., a corporation of Illinois Application May 5, 1951, Serial No. 224,702

3 Claims. (Cl. 37—90)

This invention relates to a hydraulically controlled digger and more particularly to a digger having a hydraulic control arrangement permitting more efficient digging operations, more ready manipulation of the digger controls, and preventing maloperation of and damage to the digger.

A hydraulic control arrangement is herein applied to a self-propelled ditch-digging machine of the type which has a retractible and extendible boom upon which is mounted an endless digging bucket line which cuts and removes earth in the forward movement of the machine to dig a trench.

Such machines have been provided with an engine-driven primary transmission designed to give multiple-speeds to the digging bucket line, thus enabling the ditcher to dig efficiently in soils of various types. The forward movement of such machines has also been controlled by the primary transmission through a forward feeding clutch and another multiple-speed transmission.

This arrangement is not entirely satisfactory in that the desired and most efficient forward feeding speed of the machine in relation to the speed of the bucket line cannot always be attained since the various fixed forward speeds available may not match the digging requirements. Also, the speed of the forward feeding is dependent on the speed of the primary transmission which is not entirely satisfactory since it is oftentimes desirable to change the digging bucket line speed without changing the forward feeding speed.

Further, the transmission arrangement above described requires manual braking when the forward feeding clutch is disengaged. Still another aspect in which the transmission arrangement is not completely satisfactory is that the controls of the primary transmission and the multiple-speed transmission are interrelated in operation, and manipulation of the controls to obtain the most efficient operation requires a skillful operator and can prove very tiring on even the most skillful of operators.

An object of this invention is to provide a self-propelled ditcher in which the forward feeding speed may be controlled independent of the ditcher bucket line speed.

Another object of this invention is to provide an improved ditcher in which the forward speed may be changed manually with infinite possible variations within a predetermined range.

A further object of this invention is to provide an improved ditch-digging machine having readily manipulated forward speeds and bucket line speed controls.

Still another object of this invention is to provide an improved self-propelled digging machine in which the feeding drive can be readily and instantly reversed.

A still further object of this invention is to provide an improved ditcher which is automatically braked when the feeding control is in a neutral position.

Still another object of this invention is to provide an improved digger having a hydraulic motor geared to the traction means during digging operation and relief valve means in the hydraulic feed system for the motor which prevents overloading of and damage to the traction means.

In accordance with the general objects of this invention, a hydraulic motor drives the ditcher during ditching operations, the hydraulic motor being driven from an engine-driven pump so that the feeding speed is independent of the bucket line speed control and so that the feeding speed can be continuously varied within a predetermined range. A transmission between the ditcher engine and the feed wheels may be engaged so as to by-pass the hydraulic system when higher speeds for roading or maneuvering are desired.

To control the speed of the fluid motor, the hydraulic system is provided with continuously adjustable means by-passing the fluid motor so that the speed of the motor can be continuously varied and so that the pump can be constantly operating at a speed and with an output pressure commensurate with the traction load requirements.

An important feature of this invention is the provision of control means in the hydraulic system which reverses the feeding drive and which gives the maximum attainable reverse speed regardless of the rate of forward speed setting at the time of reversal.

Another feature of this invention is in the provision of means in the hydraulic system which automatically brakes movement of the ditcher when the feeding control is neutral.

A further feature of this invention is in the provision in the hydraulic system of a hydraulic ram for controlling the raising and lowering of the boom, the control being such that feeding is suspended while raising the boom but not when lowering the boom. This is highly advantageous in that it prevents damage to the digging bucket line while the boom is being raised but allows forward speed while the boom is being lowered so that the ditcher can dig itself in.

Still another feature of this invention is in the provision of a shiftable speed ratio transmission connected through a master clutch to the engine, the transmission being adapted for alternate connection to the digging bucket line for digging operation and to the traction means for road operation, and hydraulic means for raising the digging bucket line boom and for driving the traction means during road operation, the hydraulic means being energized from a pump driven by the engine independent from the master clutch and transmission.

With this arrangement, if obstructions are encountered during digging, the master clutch can be readily disengaged to immediately stop the drive of the digging bucket line and prevent damage thereto while the boom may be raised and the traction means reversed, if desired, through the hydraulic system which is independent of the master clutch.

Other objects, features and advantages of the present invention will become more fully apparent from the following detailed description taken in conjunction with the accompanying drawings which illustrate a preferred embodiment and in which:

Figure 1 is a side elevational view of a self-propelled digging machine utilizing the control and driving system of the present invention;

Figure 2 is a view illustrating the mechanical drive connection between the ditcher engine, the main and auxiliary transmissions, the traction wheels and the digging bucket line and conveyor;

Figure 3 is a sectional view through the auxiliary transmission for controlling the traction wheel drive and the bucket line drive;

Figure 4 is a diagrammatic showing of the hydraulic control arrangement illustrating the connection between the control valve, the pump, the reservoir, hydraulic motor and hydraulic ram;

Figure 5 is a view illustrating diagrammatically the flow through the hydraulic control valve when the controls are in neutral position;

Figure 6 is a view illustrating diagrammatically the flow through the hydraulic control valve when the feed control is in reverse feed position;

Figure 7 is a view illustrating diagrammatically the flow through the hydraulic control valve when the feed control is in forward feed position;

Figure 8 is a view similar to Figure 7 illustrating how the speed control by-pass valve affects flow to and from the hydraulic motor;

Figure 9 is a view illustrating diagrammatically the flow through the control valve when the boom control is in boom-raising position and also shows the flow when by-passing due to the load on the cylinder exceeding the relief pressure valve setting with the control valve in the hoisting position;

Figure 10 is a view illustrating diagrammatically the flow through the control valve when the boom control is in boom-lowering position and illustrating how forward feed may take place in this position of the boom control;

Figure 11 is a plan view of the control valve used in the hydraulic system of this invention;

Figure 12 is a sectional view, on an enlarged scale, taken substantially along lines XII—XII of Figure 11;

Figure 13 is a sectional view, on an enlarged scale, taken substantially along lines XIII—XIII of Figure 11;

Figure 14 is a sectional view, on an enlarged scale, taken substantially along line XIV—XIV of Figure 11; and Figure 15 is a sectional view taken substantially along the lines XV—XV of Figure 14.

Referring to Figure 1, reference numeral 20 generally designates a ditching machine embodying the control system of the present invention. The machine includes a main frame 21 mounted on rear drive wheels 22 and front steering wheels 23. Other types of traction means, such as crawler tracks, may of course be provided. An operator's cab 24 may be disposed on the frame 21.

Supported from the rear portion of the frame 21 is a movable support frame or boom generally designated by reference numeral 25 on which is disposed an endless digging bucket line generally designated by reference numeral 26. The bucket line 26 includes buckets 27 connected by links 28. The buckets 27 have sharp outer teeth 29 for cutting into soil when the endless line is driven.

A conveyor belt 31 is pulley mounted on the support frame or boom 25, receives soil from the bucket line 26 and carries the soil to one side of the machine for deposit at one side of the ditch or trench. A follow-up scraper 32 is mounted on the frame 25 behind the digging bucket line to return fine soil to the buckets and to keep the ditch bottom clean.

To support the movable boom 25 from the main frame 21, a pair of tie bars 33 are pivoted at one end to the movable frame 25 and at the other end to the main frame 21. By movement of the tie bars 33 the boom 25 and associated digging apparatus can be moved from the full line operative position of Figure 1 to the dotted line position in which the lower end of the bucket line 26 is above ground for maneuvering of the machine or road operation. To guide the movable frame 25 in its movement between retracted and extended positions, a pair of abutments 34 project from the frame 25 and engage curved guides 35 affixed to the main frame 21.

To raise the support frame 25 from the lower operative position to the upper position and to control the positioning of the support frame 25 between the two positions, a hydraulic ram and block and tackle arrangement is used. This arrangement includes a cylinder 36 secured to the main frame 21, a piston 37 movable in the cylinder 36, a pulley block 38 secured to the piston 37, pulley blocks 39 supported from the main frame 21 and a rope or cable 40 secured at each end to one of the tie bars 33 and entrained around the blocks 38 and 39.

To drive the digging bucket line, a sprocket wheel 42 is drivingly connected to the bucket line and is rotatable on the axis of pivotal connection of the tie bars 33 to the boom 25. A sprocket wheel 43 is rotatable on the axis of pivotal connection of the tie bars 33 to the main frame 21 and an endless chain 44 drivingly connects the sprocket wheels 42 and 43. Thus, drive of the sprocket wheel 43 will drive the digging bucket line in any position of the movable frame 25.

As best shown in Figure 2, the drive connection between the sprocket wheel 42 and the bucket line 26 may include a shaft 45 secured to the sprocket wheel 42 and secured to a sprocket wheel about which the bucket line is entrained.

Figure 2 also shows the drive means for the conveyor belt 31. This includes a drive pulley 46 about which the conveyor belt 31 is entrained. The pulley 46 is driven through a double universal joint 47 from a bevel gear 48 which meshes with a bevel gear 49. The bevel gear 49 is connected to a sprocket wheel 50 and a sprocket wheel 52 is connected to the sprocket wheel 43 by a shaft 53. An endless chain 54 connects the sprocket wheels 50 and 52 so that drive of the shaft 53 will drive the conveyor belt drive pulley 46. Thus, drive of both the digging bucket line 26 and the conveyor belt 31 is effected through drive of the shaft 53.

Drive of shaft 53 is effected from a sprocket wheel 56 by means of a sprocket wheel 57 secured to the shaft 53 and a chain entrained about the sprocket wheels 56 and 57. The sprocket wheel 56 is driven from an auxiliary transmission generally designated by reference numeral 60 which will be described in detail hereinafter.

The rear drive wheels 22 are driven from the auxiliary transmission 60 through a universal joint 61 connected to the rear drive wheels 22 by means of a differential 62.

Mechanical drive of the auxiliary transmission 60 is effected from an engine 63 which may be of any desired type such as, for example, an internal combustion gasoline engine. The engine 63 is mechanically connected to the auxiliary transmission 60 through a clutch 64, a main transmission 65 and a universal joint 66. The main transmission 65 preferably has one reverse speed and four forward speeds.

The auxiliary transmission has a hydraulic motor 67 incorporated therein which is driven through a hydraulic control system to be described hereinafter from a hydraulic pump 69 driven from the front end of the engine 63, as illustrated in Figure 2. The hydraulic motor 67 may be any desired type, but preferably is a type in which the drive shaft will be hydraulically braked when fluid flow to and from the motor is blocked off, for a purpose which will appear later.

The hydraulic pump 69 also supplies fluid for the boom raising hydraulic ram. It will be noted that, since the pump 69 is driven from the forward end of the engine, it is independent of the master clutch 64. With this arrangement, if obstructions are encountered during digging, the master clutch can be readily disengaged to immediately stop the drive of the digging bucket line and prevent damage thereto while the boom may be raised and the drive of the wheels reversed, if desired, through the hydraulic system which is independent of the master clutch.

The auxiliary transmission 60 is best illustrated in Figure 3. Referring thereto, the auxiliary transmission includes a housing 70 which preferably fully encloses the gears of the transmission so that the gears can run in an oil bath. A main shaft 71 is rotatably journaled in the housing 70 by means of a pair of ball bearings 72 and 73. This shaft 71 is driven from the engine 63 through the clutch 64, the main transmission 65 and the universal joint 66 described above in connection with Figure 2. A bevel gear 74 is secured to the main shaft 71 and meshes with a bevel gear 75 secured to a shaft 76. The shaft 76 and the bevel gear 75 are rotatably journaled in the housing 70 by means of ball bearings 77 and 78.

The sprocket wheel 56 which drives the bucket line and conveyor belt as described above in connection with Figure 2 is rotatably disposed on the shaft 76. A jaw clutch is provided between the sprocket wheel 56 and the shaft 76. This jaw clutch includes the jaw portion 79 integral with the sprocket wheel 56 and a jaw member 80 keyed to the shaft 76 and axially movable thereon. To move the jaw member 80 between engaged and disengaged positions, an operator 81 is provided which may in turn be manually controlled by the operator of the machine through means not illustrated.

It will thus be seen that when the jaw 80 is engaged with the jaw 79, the digging bucket line and the conveyor belt will be driven from the engine 63 through the clutch 64, main transmission 65, universal coupling 66, bevel gears 74 and 75 and the shaft 76. The speed of the bucket line and conveyor belt will be determined by the speed of the engine 63 and the gear ratio to which the main transmission 65 is set.

In ditching operation of the machine, the rear drive wheels 22 are driven from the hydraulic motor 67. As shown in Figure 3, a shaft 83, which drives the wheels 22 through the universal joint 61 and the differential 62 described above, is rotatably journaled in the housing 70 by means of a ball bearing 84 and within one end of the main shaft 71 by means of a ball bearing 85. A coupling member 86 having a gear 87 affixed thereto is keyed to the shaft 83 and is axially movable between the full line and dotted line positions illustrated in Figure 3. In the full line position of coupling member 86, the gear 87 meshes with a gear 88 affixed to a shaft 89. The shaft 89 may be rotatably journaled in the housing 70 by means of ball bearings 90 and 91. Affixed to the shaft 89 is a gear 93 which meshes with a gear 94 driven by the hydraulic motor 67. Thus, when the coupling member 86 is in the full-line position, the rear drive wheels 22 will be driven by the hydraulic motor 67 and the speed will be controlled by the speed of the hydraulic motor. It may be noted that the drive wheels may be braked by braking of the hydraulic motor.

When the coupling member 86 is moved from the full line position to the dotted line position, an integral internal jaw portion 95 thereof will drivingly engage a jaw member 96 secured to the main shaft 71. In this position of the coupling member 86 the drive of the rear wheels is effected directly through the main transmission 65 and the machine can be operated as a conventional road vehicle. The movement of coupling member 86 between the full line and dotted line positions may be effected by any desired means, not illustrated, preferably from a control in the operator's cab.

The hydraulic control system is best illustrated in Figure 4. Referring thereto, the inlet side of the pump 69 is connected through a strainer 98 to a fluid reservoir tank 99. The outlet side of the pump 69 is connected through a line 101 to a control valve 102. The control valve 102 has a lever 103 which controls the hydraulic ram and a lever 104 which controls the hydraulic motor 67. The structure of the control valve 102 will be described in detail hereinafter.

One end of the cylinder 36 of the hydraulic ram is connected to the control valve 102 by a conduit 105, the connection being such that when pressure is supplied through the valve 102 and conduit 105 the piston 37 will be forced downwardly to raise the movable support frame 25 which carries the digging bucket line 26 and the conveyor belt 31. The lower end of the cylinder 36 is connected through a vent line 106 to the reservoir tank 99.

The hydraulic motor 67 is connected to the control valve 102 through a pair of conduits 107 and 108. A pair of conduits 109 and 110 extend from the control valve 102 to a by-pass valve 111, the other end of which is connected through a conduit 112 to the reservoir tank 99. A conduit 113 extends from the control valve and joins the conduit 112 for flow of fluid from the control valve back to the reservoir tank 99.

Referring to Figures 5, 6, 7, 8, 9 and 10, the flow through the control valve 102 in various positions of the levers 103 and 104 and the by-pass valve 111 is diagrammatically illustrated.

Figure 5 illustrates the flow through the valve when the levers 103 and 104 are in a neutral position, the flow being directly from the pump through the conduit 101, through the valve 102, through conduit 113 and through conduit 112 back to the reservoir.

Figure 6 illustrates the flow through the valve when the boom control lever 103 is in neutral position and the feed control lever 104 is in a position for reverse operation of the hydraulic motor 67. In this position of the controls, the fluid flows from the pump through conduit 101, through the valve 102 to conduit 108, through the hydraulic motor 67, through conduit 107, again through the control valve 102, out through the conduit 113 and back through conduit 112 to the reservoir.

Figure 7 illustrates the flow through the valve with the boom control lever 103 in neutral position, with the feed control lever 104 in a position for forward operation of the hydraulic motor 67, and with the by-pass valve 111 closed. In this position the fluid flows from the pump 69 through conduit 101, through control valve 102, through conduit 109, back through conduit 110 to the control valve, out through conduit 107 to the hydraulic motor 67, back through conduit 108 to the control valve, out through conduit 113, and back through conduit 112 to the reservoir.

Figure 8 illustrates the flow through control valve 102 when the levers 103 and 104 are in the same positions as in Figure 7, that is, with lever 103 in a neutral position and lever 104 in a position for forward operation of the hydraulic motor 67, but with the by-pass valve 111 at least partially open. In this position of the controls the fluid flows from the pump through conduit 101 to the control valve, out through conduit 109 to a point where the flow divides, a portion of the flow being through the by-pass valve 111 and the other part of the flow being through conduit 110 to the control valve, out through conduit 107 to the hydraulic motor 67, back through conduit 108 to the control valve, out through conduit 113, and back through conduit 112 to the reservoir. Thus, the fluid supplied to the hydraulic motor 67 depends upon how much fluid is by-passed through the by-pass valve 111, and hence the speed of the hydraulic motor 67 can be continuously varied by adjusting the position of the by-pass valve 111.

It may also be here noted that in the position of lever 104 for reverse operation, as shown in Figure 6, all of the fluid flow is directed through the hydraulic motor. With movement of the control lever 104 from the forward position illustrated in Figure 7 or Figure 8 to the reverse position of Figure 6, the motor will be operated in full speed reverse regardless of the setting of by-pass valve 111 when the reversal takes place. This is highly advantageous when digging up close to an obstruction or the like as will be pointed out more in detail hereinafter.

Figure 9 illustrates the flow through the control valve when the lever 103 is in position for actuating the cylinder 37 to raise the boom 25. As will be pointed out later in the detailed description of the valve 102, the flow through the valve when the lever 103 is in this position will be the same regardless of the position of the lever 104. In this position of the boom control lever 103 fluid flows from the pump through the conduit 101 to the valve, out through conduit 105 to the cylinder to actuate the piston 37 to raise the boom.

As will be described later in a detailed description of the control valve, if the movement of the piston 37 is obstructed and too high a pressure should develop in the conduit 101, fluid may flow through a relief valve in the control valve 102 out through conduit 113 and back through conduit 112 to the reservoir as indicated in Figure 9.

Figure 10 illustrates the flow through the control valve 102 when the lever 103 is positioned for lowering of the movable support frame 25 and also illustrates the flow through the hydraulic motor that may take place in this position of lever 103 so that the machine may move forwardly while the support frame is being lowered. The lowering of the boom 25 takes place through gravity acting thereon which forces the fluid out through the upper portion of the cylinder 36, through the conduit 105, through the valve 102, out through conduit 113, and back through conduit 112 to the reservoir.

Simultaneously, fluid may flow from the pump through the conduit 101, through the control valve 102 out through conduit 109 where the flow divides, part of the fluid flowing through the by-pass valve 111 and back through conduit 112 to the reservoir, and the remaining part flowing through conduit 110 back through the control valve out through conduit 107 to the hydraulic motor, back through conduit 108 to the control valve, out through conduit 113 and back through conduit 112 to the reservoir. The amount of flow by-passed through the by-pass valve 111 and consequently the amount of fluid flow through the hydraulic motor is, of course, controlled by the position of the by-pass valve 111.

It may be noted that, since the boom is lowered by gravity, the full output of the pump is available for driving the motor 67 when the boom is being lowered.

Referring now to Figures 11, 12, 13, 14 and 15, the construction and operation of the control valve 102 will be described in detail.

This valve 102 includes a pair of end caps 116 and 117 between which three valve body sections 118, 119 and 120 are disposed. The end caps and body sections may be secured together by means of tie bolts 121 extending through the end caps and body sections, nuts 12 being threaded on the ends of the bolts 121. The assembly may be secured to a portion 123 of the machine, preferably in the operator's cab, by means of bolts or screws 124.

The valve body sections 118, 119 and 120 have plungers 126, 127 and 128, respectively, slidably disposed therein. The plunger 126 is operated by the boom control lever 103 and the plungers 127 and 128 are both operated by the feed control lever 104. For this purpose a bracket 129 is secured to the portion 123 by bolts or screws 130. The bracket 129 has outwardly extending arms 129a, 129b and 129c. The lever 103 is pivoted on a pin 132 extending through the arms 129a and 129b and has its end portion connected to the plunger 126 by means of a pair of links 133 which are pivotally secured to the lever 103 by means of a pin 134 and pivotally secured to the plunger 126 by a pin 135.

The lever 104 is bifurcated at its inner end to form spaced arm portions 137 and 138 and is pivotally secured to the bracket 129 by means of a pin 139 extending through the arms 129b and 129c and the portions 137 and 138.

The portion 137 is connected to the plunger 127 by means of a pair of links 141 which are pivotally secured to the portion 137 by means of a pin 142 and are pivotally secured to the plunger 127 by means of a pin 143. It will be noted that the links 141 have longitudinally extending slots 141a through which the pin 142 extends, thus providing a lost-motion connection between the lever 104 and the plunger 127 for a purpose which will appear hereinafter.

The portion 138 of the lever 104 is connected to the plunger 128 by means of a pair of links 144 which are pivotally secured to the portion 138 by means of a pin 145 and are pivotally secured to the plunger 128 by means of a pin 146.

To maintain the plunger 126 in the neutral position illustrated in Figures 12 and 14, a hollow cap 148 is threaded into the lower end of the valve body section 118 and extends over the lower end portion of the plunger 126. A ring 149 is disposed on the plunger 126 and is adapted to engage an annular abutment on the plunger 126 and annular abutment in the valve body portion 118. A similar ring 150 is adapted to engage an annular abutment on the plunger 126 and an annular abutment in the cap 148. Between the rings 149 and 150 is a helical compression spring 151 resiliently urging the ring 149 into engagement with the annular abutment of the plunger 126 and the valve body section 118 and the ring 150 into engagement with the annular abutment in the cap 148 and on the plunger 126.

It will be seen that the plunger 126 can be moved up or down against the action of the compression spring 151 and will be returned to the neutral position illustrated in Figures 12 and 14 when released.

Means are provided for locking the plunger 128 in any one of three selected positions. A cap member 153 is threaded into the lower end of the valve body section 120 and extends over the lower end of the plunger 128. A spring-pressed ball detent 154 is mounted in the cap member 153 and is adapted to engage any one of three vertically spaced annular grooves 155, 156 and 157 in the lower end portion of the plunger 128 to lock the plunger in a selected vertical position.

Similar means are provided for locking the plunger 127. A cap member 158 is threaded into the lower end of the valve body 119. Mounted in the cap member 158 is a spring-pressed ball detent (not shown) which is adapted to engage either of two vertically spaced grooves 159 and 160 in the lower end portion of the plunger 127. Only two annular grooves are provided in the plunger 127 since, due to the lost-motion connection between the lever 104 and the plunger 127 described above, the plunger 127 will not be moved downwardly when the lever 104 is moved downwardly.

The end cap 116 has an opening 161 into which the conduit 101 from the pump 59 may be connected. The opening 161 extends into a chamber 162 which thus has fluid under pressure from the pump 69 therein. The end cap 117 has an opening 163 therein into which the conduit line 113 may be connected. This opening 163 extends into a chamber 164.

The valve body sections 118, 119 and 120 have aligned openings 166 therethrough which communicate with a passage 167 in the end cap 116 and with the chamber 164 in the end cap 117. As best shown in Figure 15, the passage 167 in the end cap 116 communicates with a chamber 168 at one side of a spring-pressed relief valve member 169. A passage 170 extends from the other side of the relief valve member 169 to the chamber 162. It will be readily seen that when the pressure from the pump 69 is sufficient to overcome the spring pressure acting against the relief valve member 169, the fluid can flow from the chamber 162 through the passage 170, past the relief valve 169 into the chamber 168, through the passage 167, through the aligned openings 166 in the three valve body sections, to the chamber 164 in the end cap 117, out through conduit 113, and back through conduit 112 to the reservoir. The relief valve 169 thus prevents blocking of the pump and damage thereto.

The relief valve 169 also limits the pressure which may be applied to the hydraulic motor 67. This is highly advantageous considering that the drive wheels are connected through a reduction gearing to the hydraulic motor so that a high torque can be applied to the wheels. If movement of the machine is blocked, this high torque could cause damage to the wheels or the gear train. The relief valve is preferably set so that the torque applied to the wheels does not exceed the safe design value, and hence the damage to the drive wheels or gear train is prevented. It may be noted that this torque limiting means would possibly be of even greater advantage if crawler tracks were substituted for the drive wheels shown, since crawler tracks will not slip on the ground as readily as wheels.

Referring to Figures 12 and 14, the valve body section 118 has vertically spaced annular internal grooves 172, 173, 174, 175 and 176 surrounding the plunger 126. The plunger 126 has portions 177 and 178 of reduced diameter which, together with the internal surfaces of the valve body section 118, form fluid flow passageways.

The annular groove 172 communicates with a passage 180 extending to the valve body section 119. The annular groove 173 communicates with the chamber 162 in the end cap 116 through a passage 181. As shown in Figure 12, the annular groove 174 communicates with the conduit 105 through a check valve including a spring-pressed ball 182. The annular groove 175 communicates through the passage 183 with the opening 166 which, as described above, communicates with the reservoir. The annular groove 176 communicates directly with the conduit 105 which is connected to the upper end of the hydraulic cylinder 36.

In the position of the plunger 126, illustrated in Figures 12 and 14, fluid may flow from the pump, through conduit 101 into chamber 162 and from chamber 162 through the passage 181 into the valve body section and out through the passage 180 into the valve body section 119. The flow in the valve body sections 119 and 120 will control the operation of the hydraulic motor 67 as will be hereinafter described.

When the plunger 126 is moved downwardly from the position illustrated in Figures 12 and 14, the fluid flow will be as diagrammatically illustrated in Figure 9. Fluid under pressure from the pump will flow from the chamber 162 through the passage 181 into the valve body section 118 and out through the groove 174, past the spring-pressed ball 182 into the conduit 105 and to the upper portion of cylinder 36 to force the piston 37 downwardly to raise the boom 25. It will be noted that in this downward position the plunger 126, the annular internal groove 172 of the valve body section 118 will be closed off so that fluid cannot flow through the passage 180 to the valve body sections 119 and 120, and consequently the hydraulic motor 67 will be blocked off and will brake the wheels so that movement of the machine will not occur.

If the lever is held up after the piston is moved to the limit of its movement, fluid pressure building up in the chamber 162 will be released through the relief valve 169.

When the plunger 126 is moved upwardly from the neutral position illustrated in Figures 12 and 14, the piston 37 in the cylinder 36 will be moved upwardly by the action of gravity on the boom 25 and fluid will be forced out through the conduit 105 into the annular internal groove 176, into the annular groove 175, through the passage 183 into opening 166, into the chamber 164 in the end cap 117, out through conduit 113, and back through conduit 112 to the reservoir.

It will be noted that in this upper position of the plunger 126 fluid under pressure from the pump may flow from the chamber 162, through the passage 181, and through the passage 180 to the valve body sections 119 and 120 so that the hydraulic motor 67 may be operated. The flow through the control valve 102 in this upper position of the plunger 126 is diagrammatically illustrated in Figure 10.

The fluid flow passages in the valve body sections 119 and 120 and the plungers 127 and 128 are exactly the same, and for that reason a section (Figure 13) has been taken only through the valve body section 120. Referring to Figures 13 and 14, the valve body section 120 has vertically spaced internal annular grooves 185, 186, 187, 188, 189, 190 and 191 around the plunger 128. The groove 185 communicates directly with the conduit 107 which extends through the hydraulic motor 67. The annular groove 186 communicates through a passage 193 with the chamber 164 in the end cap 117. The annular groove 187 communicates with the conduit 107 through a check valve including a spring-pressed ball 194. The annular groove 188 communicates through a passage 195 with the valve body section 119. The annular groove 189 communicates through a check valve including a spring-pressed ball 196 with the conduit 108 which is connected to the hydraulic motor 67. The internal annular groove 190 communicates through a passage 197 with the chamber 164 in the end cap 117. The annular groove 191 communicates directly with the conduit 108.

The plunger 128 has vertically spaced reduced diameter portions which, together with the opposing internal surface portion of the valve body 120, form fluid flow passages. The plunger 128 also has an internal chamber 201 from which extends horizontal, vertically spaced passages 202, 203 and 204.

As indicated above, the fluid flow passages in the valve body section 119 and the plunger 127 are the same as those in the valve body section 120 and plunger 128. The valve body section 119 has vertically spaced internal annular grooves 206, 207, 208, 209, 210 and 211 around the plunger 127 which correspond with the internal grooves 185, 186, 187, 188, 190 and 191 of the valve section 120.

The annular groove 206 communicates directly with the conduit 109 extending to the by-pass valve 111; the groove 207 communicates through a passage 212 with the passage 195 in the valve body section 120; the annular groove 208 communicates through a relief valve (not shown) with the conduit 109 extending to the by-pass valve 111; the annular groove 209 communicates with the passage 180 in the valve body section 118; the annular groove 210 communicates through a passage 213 with the passage 195 in the valve body section 120; and the annular groove 211 communicates with the conduit 110 which extends to the by-pass valve 111.

The plunger 127 has an axially extending chamber 214 similar to the chamber 201 in the plunger 128. Extending from the chamber 214 are horizontal, vertically spaced passages 215, 216 and 217 similar to the passages 202, 203 and 204 in the plunger 128.

In the neutral position of plungers 126, 127 and 128 illustrated in the drawings, fluid will flow as diagrammatically illustrated in Figure 5. In this case, fluid under pressure from the pump may flow from the chamber 162 through the passage 181 in the valve body section 118 through the passage 180 into the annular groove 209 in the valve body section 119, through the pasages 216 in the plunger 127, into the chamber 214, out through the passages 215 and 217 into the passages 212 and 213, respectively, into the passage 195 in the valve body section 128, through the passages 203 in the plunger 128 into the internal chamber 201, out through the passages 202 and 193 and through the passages 204 and 197 into the chamber 164 in the end cap 117, out through the conduit 113 and back to the conduit 112 to the reservoir 99.

It will be noted that with the lever 104 in the neutral position the hydraulic motor 67 will be blocked off and will act as a brake on the drive wheels. Thus, operation of a manual brake is not necessary.

When the lever 103 and plunger 126 are in the neutral positions illustrated in the drawings and the lever 104 is moved downwardly, the position of plunger 127 will not be changed due to the lost-motion connection between lever 104 and the plunger 127, but the plunger 128 will be moved downwardly. The flow of fluid under pressure from the pump through the valve body sections 118 and 119 will be the same as described above, and fluid under pressure will flow through the passage 195 in the valve body section 120. The plunger 128 will be in its downward position and fluid may flow from the annular groove 188 to the annular groove 189, past the spring-pressed ball 196, through the conduit 108 to the hydraulic motor 67, from the hydraulic motor back to the conduit 127 into the annular groove 185, to the annular grove 186, through passage 193 into the chamber 164 in the end cap 117, out through the conduit 113, and back through the conduit 112 into the reservoir tank 99. This fluid flow corresponds to that shown in diagrammatic form in Figure 6.

It will be noted that the conduits 109 and 110 leading to the by-pass valve 111 are blocked off since the plunger 127 is in its neutral position illustrated in the drawings.

When the lever 103 is in its neutral position and the lever 104 is moved upwardly, both the plunger 127 and 128 will be moved upwardly. In this position of the lever fluid under pressure from the pump may flow from the chamber 162 in the end cap 116, through the valve body section 118 to the annular groove 209 in the valve body section 119. Fluid may flow from the internal groove 209 to the internal groove 208, out through a check valve (not shown) to the conduit 109, toward the by-pass valve 111, back through the conduit 110, into the internal groove 211 in the valve body section 119, to the internal groove 210, out through the passage 213, through the passage 195 in the valve body section 120, into internal grooves 188 and 187, past the spring-pressed ball 195, through the conduit 107 to the hydraulic motor 67, from the hydraulic motor through the conduit 108 into the internal annular groove 191, into the annular groove 190, out through passage 197 into the chamber 164 in the end cap 117, out through the conduit 113, and back through the conduit 112 to the reservoir tank 99.

This flow is diagrammatically illustrated in Figures 7 and 8 as described above. It will be noted that by adjustment of the by-pass valve 111 the flow to the hydraulic motor can be controlled and the forward speed of the hydraulic motor varied.

In summary, in the machine as above described in detail, the speed control of the drive wheel during digging operation is independent of the speed control of the digging bucket line and conveyor. In digging operation, the speed of the drive wheels may be continuously varied within predetermined limits by adjustment of the by-pass valve controlling the hydraulic motor. The speed of the bucket line and conveyor is controlled through the main transmission which may be of a conventional construction. The hydraulic motor, which drives the drive wheel during digging operations, may be readily disconnected and the wheels connected directly to the main transmission for road operation. Thus, the main transmission serves the dual function of controlling the speed of the bucket line in digging operation and the drive speed in road operations.

Further, provision is made in the hydraulic system for instantly shifting to full reverse speed regardless of forward speed setting so that the ditcher may dig up very close to an obstacle and be readily backed away to prevent damage to the digging bucket line. Also, when the hydraulic controls are in neutral position the drive wheels are automatically braked so that manual braking is not necessary. Through the hydraulic system, the control of the hydraulic ram also controls the forward feeding so that the machine may move forwardly while the digging bucket line boom is moved downwardly but cannot move when the boom is moved upwardly.

Thus, there is here provided a ditcher which can be easily controlled to obtain highly efficient digging operation, in which the controls are correlated in a manner such that damage to the machine is obviated and which can be readily and economically manufactured.

Certain features of the hydraulic system disclosed in this application are disclosed and claimed in our copending application entitled "Hydraulic Drive System," filed May 29, 1951, U. S. Serial No. 228,812, now Patent No. 2,658,342.

It will be understood that modifications and variations may be effected without departing from the spirit and scope of the novel concepts of the present invention.

We claim as our invention:

1. In a ditching machine, a main frame, traction means connected to said frame and operable to propel the machine along the ground, digging means, a boom connected to said frame and said digging means and actuatable to raise and lower said digging means, boom-raising means on said frame connected to said boom and actuatable to effect raising of said boom, an engine on said frame, a first drive transmission coupling said engine to said traction means, a second drive transmission coupling said engine to said boom-raising means, a manually actuatable boom-control element connected to said second drive transmission and movable to a boom-raising position to render said second drive transmission effective, and means connected to said first drive transmission and controlled by movement of said boom-control element to said boom-raising position to render said first drive transmission ineffective.

2. In a ditching machine, a main frame, traction means connected to said frame and operable to propel the machine along the ground, digging means, a boom connected at one end thereof to said digging means and pivotally connected at the other end thereof to said frame, a hydraulic piston and cylinder assembly connected between said frame and said boom to raise said boom against the force of gravity upon supply of fluid under pressure to said cylinder, a hydraulic motor drivingly connected to said traction means, a reservoir on said frame, a pump on said frame having an outlet and an inlet connected to said reservoir, first valve means in fluid connection between said pump outlet and said cylinder, second valve means in fluid connection between said pump outlet and said hydraulic motor, third valve means in fluid connection between said cylinder and said reservoir, and means for simultaneously closing said second valve means and opening said third valve means to allow lowering of said digging means by the force of gravity, whereby the full output pressure of said pump is available for use in propelling the vehicle as the digging means engages the ground.

3. In a ditching machine, a main frame, traction means connected to said frame and operable to propel the machine along the ground, digging means, a boom connected to said frame and said digging means and actuatable to raise and lower said digging means, hydraulically actuated boom-raising means on said frame connected to said boom and actuatable to effect raising of said boom, an engine on said frame, an adjustable speed transmission on said frame, a master clutch connecting said engine and transmission, a hydraulic motor, means for selectively connecting said traction means to said hydraulic motor for digging operation and to said transmission for road operation, means actuatable to connect said pump to said boom raising means and said hydraulic motor, and means drivingly connecting said pump to said engine independently of said master clutch and transmission, whereby the operation of the hydraulic system and the drive speed of the pump are unaffected by operation of said master clutch and the speed ratio setting of said transmission.

(References on following page)

References Cited in the file of this patent

UNITED STATES PATENTS

| | | | |
|---|---|---|---|
| 1,625,912 | Ralph | Apr. 26, | 1927 |
| 1,756,971 | Brown | May 6, | 1930 |
| 2,084,887 | Bennett | June 22, | 1937 |
| 2,109,393 | Le Bleu | Feb. 22, | 1938 |
| 2,252,837 | Dicke | Aug. 19, | 1941 |
| 2,263,779 | Jeffrey et al. | Nov. 25, | 1941 |
| 2,393,882 | Blair | Jan. 29, | 1946 |
| 2,529,193 | Rueter | Nov. 7, | 1950 |
| 2,550,071 | Larkin | Apr. 24, | 1951 |
| 2,617,314 | Everett | Nov. 11, | 1952 |
| 2,641,070 | Bennett | June 9, | 1953 |
| 2,658,342 | Bannister et al. | Nov. 10, | 1953 |
| 2,708,800 | Logus | May 24, | 1955 |

OTHER REFERENCES

Engineering News Record, July 20, 1950, page 110, Unit Rig. and Equipment Co. photograph and caption. (Copy available in Library.)